US006797837B2

(12) United States Patent
Kords et al.

(10) Patent No.: US 6,797,837 B2
(45) Date of Patent: Sep. 28, 2004

(54) PROCESS FOR THE PREPARATION OF STABILIZED POLYCARBONATE

(75) Inventors: Christian Kords, Krefeld (DE); Jürgen Heuser, Krefeld (DE); Antonio Ortiz, Duisburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 13 days.

(21) Appl. No.: 10/407,595

(22) Filed: Apr. 4, 2003

(65) Prior Publication Data

US 2003/0191220 A1 Oct. 9, 2003

(30) Foreign Application Priority Data

Apr. 9, 2002 (DE) ........................................ 102 15 496
Aug. 20, 2002 (DE) ........................................ 102 38 006

(51) Int. Cl.[7] ................................................ C07C 69/96
(52) U.S. Cl. .......................... 558/260; 528/51; 528/141
(58) Field of Search ........................... 558/260; 528/51, 528/141

(56) References Cited

U.S. PATENT DOCUMENTS

| | | | | |
|---|---|---|---|---|
| 3,953,539 | A | 4/1976 | Kawase et al. | 260/860 |
| 4,873,314 | A | 10/1989 | Berg et al. | 528/487 |

FOREIGN PATENT DOCUMENTS

| | | |
|---|---|---|
| EP | 0 023 570 | 2/1981 |
| EP | 0 300 485 | 1/1989 |
| EP | 0 905 178 | 3/1999 |
| GB | 625297 | * 12/1945 |
| GB | 625297 | 6/1949 |
| GB | 778903 | * 7/1957 |
| GB | 893396 | 4/1962 |
| JP | 1-315459 | 12/1989 |
| JP | 4-81457 | 3/1992 |
| JP | 7-126505 | 6/1995 |
| JP | 10-60247 | 3/1998 |
| JP | 2001-31859 | 2/2001 |

OTHER PUBLICATIONS

Database WPI Section Ch, Week 199916 Derwent Publications Ltd., London, GB; AN 1999–186480 XP002247358 –& JP 11 035815 A (Teijin Kasei Ltd), Feb. 9, 1999, Zusammenfassung, Absätze, '0004!—'0033!, '0048!—'0055!; Anspruch 1.

* cited by examiner

*Primary Examiner*—Rita Desai
*Assistant Examiner*—Hector M. Reyes
(74) *Attorney, Agent, or Firm*—Joseph C. Gil; Aron Preis

(57) ABSTRACT

A process for preparing an emulsion is disclosed. The process entails mixing an aqueous mineral acid that contains phosphorous in an organic solvent, the mixing being continuous and with the degree of intensity sufficient to form a homogeneous emulsion. The emulsion prepared by the process is useful in the process of preparing polycarbonate by the interfacial process. Accordingly the washed organic polycarbonate that has been washed without the use of a phosphorous containing mineral acid solution is mixed with the novel emulsion. The resulting polycarbonate is characterized by its improved thermal stability.

10 Claims, No Drawings

PROCESS FOR THE PREPARATION OF STABILIZED POLYCARBONATE

FIELD OF THE INVENTION

The invention relates to a process for the preparation of polycarbonates and more particularly the interfacial polycondensation process.

BACKGROUND OF THE INVENTION

For the preparation of polycarbonates by the so-called interfacial process, dihydroxydiarylalkanes in the form of their alkali salts are reacted with phosgene in heterogeneous phase in the presence of inorganic bases such as sodium hydroxide solution and an organic solvent in which the product polycarbonate is readily soluble. During the reaction, the aqueous phase is distributed in the organic phase, and after the reaction the organic polycarbonate-containing phase is separated from the aqueous phase and washed several times with an aqueous liquid, during which electrolytes, residual monomers and catalyst inter alia are removed. The washing liquid is then separated off as far as possible. Finally, the polycarbonate is freed of the organic solvent and converted into a form which may readily be processed further, for example granular form.

This known interfacial process is described by way of example and in detail in the following publications:

Schnell, "Chemistry and Physics of Polycarbonates", Polymer Reviews, Volume 9, Interscience Publishers, New York, London, Sydney 1964, p. 33 ff;

D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18, (1980), p. 75 ff;

D. Freitag, U. Grigo, P. R. Müller, N. Nouvertne, BAYER AG, "Polycarbonates" in Encyclopedia of Polymer Science and Engineering, Volume 11, Second Edition, 1988, p. 651 ff; and finally Dres. U. Grigo, K. Kircher and P. R. Müller, "Polycarbonate" in Becker/Braun, Kunststoff-Handbuch, Volume 3/1, Polycarbonate, Polyacetale, Polyester, Celluloseester, Carl Hanser Verlag Munich, Vienna 1992, p. 118 ff and 138 ff.

These publications relate to corresponding syntheses of polycarbonate according to the so-called "interfacial process", which takes place in a two-phase reaction mixture consisting of inorganic phase (water, alkali) and an organic phase (organic solvents, insoluble in water, mostly chlorinated hydrocarbons such as dichloromethane and/or chlorobenzene).

The product of that synthesis is an organic phase (synthesis solution), which contains the polycarbonate in dissolved form, and an inorganic aqueous-alkaline phase, which contains the salts formed in the synthesis, such as NaCl, sodium hydrogen carbonate, soda, additionally residues of the phenolates, bisphenolates and sodium hydroxide used, as well as catalysts and secondary products thereof, as well as water-soluble compounds originating as impurities from the starting materials or formed as by-product. If a different basic compound is used instead of NaOH, the aqueous alkaline phase contains the corresponding analogous salts or secondary products.

The aim of the working-up which follows is to separate off the inorganic aqueous phase as completely as possible and to remove the remaining, especially alkaline residues of the inorganic compounds, which are contained in the soluble and dispersed water content of the separated organic phase, as completely as possible from the organic phase. This is achieved by washing operations, which are optionally combined with acidification steps. If possible, these purification operations are carried out before concentration of the organic phase, if thermal methods are used for the purpose of concentration.

Purification of the synthesis solution is achieved by washing that organic solution with water one or more times. In general, this is effected by means of one or more acidification operations and washing with water, mostly in several steps.

The acidification includes either the entire alkali potential of the synthesis or preferably, after separation of the phases in the alkaline pH range, only the neutralization of residual constituents of the aqueous phase dissolved or, in admixture with residues of the aqueous phase, dispersed in the organic phase. There are used for such acidification operations aqueous mineral acids, especially hydrochloric acid and phosphoric acid, but also aqueous solutions of organic acids.

This washing and acidification is likewise the subject-matter of many patents and publications.

For example, EP-A 0 023 570 describes a process for working up the alkaline synthesis solution using separators that produce shear energy, optionally with the use of dispersing agents.

According to the invention, polycarbonates are to be understood as being those based on suitable diphenols, for example hydroquinone, resorcinol, dihydroxydiphenyl, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl)-sulfones, bis-(hydroxyphenyl) sulfoxides, α,α'-bis-(hydroxyphenyl)-diisopropylbenzenes, and also compounds thereof alkylated at the nucleus and halogenated at the nucleus.

Preferred diphenols are hydroquinone, resorcinol, 4,4'-dihydroxydiphenyl, 2,2-bis-(4-hydroxyphenyl)-1-phenyl-propane, 1,1-bis-(4-hydroxyphenyl)-phenyl-ethane, 2,2-bis-(4-hydroxyphenyl)propane, 2,4-bis-(4-hydroxyphenyl)-2-methylbutane, 1,1'-bis-(4-hydroxyphenyl)-m- or -p-diisopropylbenzene, 2,2-bis-(3-methyl-4-hydroxy-phenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1'-bis-(3,5-dimethyl-4-hydroxyphenyl)-m- or -p-diisopropylbenzene and 1,1-bis-(4-hydroxyphenyl)-3,3,5-trimethylcyclohexane.

Particularly preferred diphenols are resorcinol, 4,4'-dihydroxydiphenyl, 1,1-bis-(4-hydroxyphenyl)-phenyl-ethane, 2,2-bis-(4-hydroxyphenyl)-propane, 2,2-bis-(3,5-dimethyl-4-hydroxyphenyl)-propane, 1,1'-bis-(3,5-dimethyl-4-hydroxyphenyl)-m- or -p-diisopropylbenzene, 1,1-bis-(4-hydroxyphenyl)-cyclohexane and 1,1-bis-(4-hydroxyphenyl)-3,3,5-trimethylcyclohexane.

These and other suitable diphenols are described, for example, in U.S. Pat. Nos. 3,028,635, 2,999,835, 3,148,172, 2,991,273, 3,271,367, 4,982,014 and 2,999,846, in DE-A 1 570 703, 2 063 050, 2 036,052, 2 211 956 and 3 832 396, French Patent Specification 1 561 518, in the monograph "H. Schnell, Chemistry and Physics of Polycarbonates, Interscience Publishers, New York 1964", p. 77 ff and in JP-A 62039/1986, 62040/1986 and 105550/1986.

In the case of homopolycarbonates, only one diphenol is used, and in the case of copolycarbonates a plurality of diphenols is used, it being possible, of course, for the bisphenols used, like all the other chemicals and auxiliary substances added to the synthesis, to be contaminated with the impurities from their own synthesis, although it is desirable to use raw materials that are as clean as possible.

As carbonate precursor there are used halogen derivatives of carbonic acid, such as are described in the cited literature, especially phosgene.

Catalysts include ammonium and/or phosphonium compounds or tertiary amines such as are described in the literature, especially N-ethylpiperidine, N-methylpiperidine, triethylamine and tributylamine, or mixtures thereof, it being possible for such catalysts to be added in a single metered amount or alternatively the metering in of several amounts at time intervals (batch process) or in space (continuous process).

There may be used as the alkaline components any alkali and alkaline earth hydroxides that are soluble or dispersible in water, but preferably sodium hydroxide, potassium hydroxide, magnesium hydroxide and/or calcium hydroxide (suspension of calcium oxide in water) or mixtures thereof.

The solids content of the polymer solution to be washed may vary according to the molecular weight of the polymer of 0.5 wt. % to 30 wt. % polymer; at molecular weights (weight average "Mw") of 8000 to 50,000, preference is given to polymer solids contents of 2 wt. % to 25 wt. % polymer, preferably 5 wt. % to 22 wt. % polymer, particularly preferably to polymer solids contents of 7 wt. % to 20 wt. %, and at molecular weights (Mw)>50,000, preference is given to polymer solids contents of 2 wt. % to 15 wt. % polymer.

The molecular weight (weight average Mw) is determined by means of gel permeation chromatography (GPC) with methylene chloride as eluant. Detection is by means of UV or refractive index (RI). Columns based on polystyrene gels, calibrated against polycarbonate, are used. In the present case, a HP 1050 was used.

The organic solvent for the polycarbonate solution to be washed includes solvents which are solvents for the polycarbonate in question and yield a two-phase mixture with water. These include aliphatic, optionally branched, partially halogenated or perhalogenated solvents having from 1 to 10 carbon atoms, with chlorine or fluorine being used as the halogen, such as methylene chloride, trichloroethane, tetrachloroethene, also optionally substituted aromatic compounds having from 6 to 18 carbon atoms, such as benzene, toluene, o-, m- and/or p-xylene, methoxy- or ethoxybenzene, diphenyl, diphenyl ether, chlorobenzene, o-, m- and/or p-dichlorobenzene, as well as mixtures of such solvents. Preferred solvents are methylene chloride and chlorobenzene, especially chlorobenzene.

Suitable chain terminators are both monophenols and monocarboxylic acids. Suitable monophenols are phenol, alkylphenols such as cresols, p-tert-butylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, and mixtures thereof.

Suitable monocarboxylic acids are benzoic acid, alkylbenzoic acids and halobenzoic acids.

The amount of chain terminator to be used is from 0.5 mol % to 10 mol %, based on moles of diphenols used in a particular case. The addition of the chain terminators may take place before, during or after the phosgenation.

Suitable branching agents are the tri- or poly-functional compounds known in polycarbonate chemistry, especially those having three or more phenolic OH groups.

Suitable branching agents are, for example, phloroglucinol, 4,6-dimethyl-2,4,6-tri-(4-hydroxyphenyl)-heptane, 2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)phenyl)-orthoterephthalic acid ester, tetra-(4-hydroxyphenyl)-methane, tetra-(4-(4-hydroxyphenyl-isopropyl)-phenoxy)-methane and 1,4-bis-(4',4"-dihydroxy-triphenyl)-methyl)-benzene, as well as 2,4-dihydroxybenzoic acid, trimesic acid, cyanuric chloride and 3,3-bis-(3-methyl-4-hydroxyphenyl)-2-oxo-2,3-dihydroindole or a mixture thereof.

The amount of branching agents that are optionally to be used is 0.05 mol % to 2.5 mol %, preferably 0.1 to 1.0 mol %, based on moles of diphenols used in a particular case.

The branching agents may either be used initially with the diphenols and the chain terminators in the aqueous alkaline phase, or they may be added in solution in an organic solvent before the phosgenation.

All these measures for the preparation of the polycarbonates are known to the person skilled in the art.

The preferred method of preparing the polycarbonates to be used according to the invention is the known interfacial process.

The molecular weights (Mw) of the polycarbonates according to the invention are 12,000 to 50,000, preferably 12,000 to 40,000, particularly preferably 15,000 to 40,000. The molecular weights are determined by the GPC process already described above.

Highly pure polycarbonate is used for optical and magneto-optical data storage means, optical lenses and prisms, glazing for motor vehicles and headlamps, glazing of other kinds, such as for greenhouses.

The reduction in the processing times during the injection molding process requires higher melt temperatures during the process of producing the molded articles, and this causes increasing yellowing of and thermal damage to the polycarbonate; in addition, the mold release aids may react with the polycarbonate under such conditions. The object underlying the invention is, therefore, to achieve high stabilizing effects with the lowest concentrations of known stabilizers, without any change in the other properties of the polycarbonate and of the moldings produced therefrom.

The following attempts to achieve corresponding stabilization are known:

JP 10060247 A: from 0.001 to 0.01 parts by weight of phosphoric acid in the PC for optical data storage means, lenses, etc., good transparency, good heat stability without decomposition and yellowing.

JP 04081457 A UPAB: from 5 to 50 ppm of phosphoric acid to the polycarbonate, no spots and faults on exposure to high temperature and moisture.

JP 01315459 A: from 0.0005 to 0.01 parts by weight of phosphoric acid, good for optical data storage means, lenses and prisms, processing at from 300 to 380° C. without thermal damage.

JP 2001031859 A: at least one phosphorus-based stabilizer in an amount by weight of from 0.0001 to 0.15, good heat stability.

JP 07126505 A: PC with from 0.05 to 5 ppm of phosphoric acid, PC for CDs etc..

This prior art discloses the metering of phosphoric acid, together with a mold release agent, into the polycarbonate melt. This improved the thermal stability, but not to a satisfactory degree. Accordingly, the totality of the mold release agent still reacts with the PC, especially on further processing to molded articles. The stabilizing effects achieved according to the prior art are therefore still inadequate. Further improvements in this field are highly desirable.

The object was therefore to provide an improved process for the stabilization of polycarbonates.

Surprisingly, it has now been found that thermally stable polycarbonate may be prepared by an improvement to the interfacial polycondensation process. The improvement comprise introducing to the washed polycarbonate solution a small amount of an emulsion of phosphoric acid in an organic solvent. The introduction is carried out by intensive mixing of the emulsion into the polycarbonate solution. The resulting polycarbonate and the articles molded therefrom feature improved thermally stability. In the context of the invention, phosphoric acid is a mineral acid that contains phosphorous.

According to the invention, phosphoric acid is to be understood as meaning any desired mineral acid containing phosphorus, preferably phosphoric acid in the form of ortho-, meta- or poly-phosphoric acid, phosphorous acid and hypophosphorous acid, particularly preferably phosphoric acid in the form of ortho-, meta- or poly-phosphoric acid, most particularly preferably orthophosphoric acid.

In this process, it is not the property of the phosphoric acid nor the amount of phosphoric acid in the polycarbonate that is critical, but the formation of a phosphoric acid emulsion in an organic solvent mixture and the distribution of the phosphoric acid emulsion so prepared in the PC solution after washing of the polycarbonate. The phosphoric acid remains in the polycarbonate solution, which is fed to the subsequent process of concentration by evaporation for isolation of the polycarbonate. This stabilizing effect is present whenever an acid other than phosphoric acid is used for removal of the catalyst in the preceding washing process.

The phosphoric acid emulsion is prepared by emulsification of 6 to 10 wt. %, preferably 7 to 9 wt. %, particularly preferably 8 wt. %, aqueous phosphoric acid in an amount of 500 to 2000 ppm, preferably 800 to 1200 ppm, particularly preferably 1000 ppm, in an organic solvent mixture that includes monochlorobenzene and dichloromethane. The amount of dichloromethane in the solvent mixture is 10 to 70%, preferably 20 to 60%, particularly preferably 50%. The phosphoric acid-solvent emulsion is kept stable by continuous mixing of the two phases. Mixing pumps or intensive high-speed stirrers, for example, may be used as the mixing members.

Metering of the phosphoric acid emulsion takes place after washing of the polycarbonate and before the isolation process, that is to say into the washed PC solution. The phosphoric acid emulsion is metered in in such an amount as to achieve 0.15 to 2 ppm, preferably 0.3 to 1.5 ppm, particularly preferably 0.6 to 1 ppm, most particularly preferably 0.8 ppm, of phosphorus, based on polycarbonate. In the case of orthophosphoric acid, this corresponds to 0.5 to 5 ppm, preferably 1 to 4 ppm, particularly preferably 2 to 3 ppm, most particularly preferably 2.5 ppm, of phosphoric acid, based on polycarbonate.

All percentages in the present context are to be understood as being wt. %, unless explicitly mentioned otherwise.

Preference, particular preference or most particular preference is given to embodiments which make use of the parameters, compounds, definitions and explanations mentioned under preferred, particularly preferred or most particularly preferred.

However, the above-mentioned definitions, parameters, compounds and explanations mentioned generally or in preferred ranges may also be combined with one another as desired, that is to say between the respective ranges and preferred ranges.

Distribution of the phosphoric acid emulsion in the polycarbonate solution may be carried out by means of a high-speed dynamic mixer. A mixing pump or the mixing chamber of a disk separator, for example, may be used for that purpose.

The present Application relates also to the polycarbonates as prepared by the process according to the invention and to their use in the production of extrudates and molded articles, especially those for use in application requiring transparent resins, most particularly in the field of optical applications, such as, for example, sheets, multi-wall sheets, glazing, headlight lenses, lamp covers, or optical data storage means, such as audio CDs, DVDs, minidiscs in their various read-only or recordable, optionally also rewritable forms.

The present Application also provides the extrudates and molded articles produced from the low-fault polymers according to the invention.

What is claimed is:

1. A process for preparing an emulsion comprising mixing an aqueous mineral acid that contains phosphorous in an organic solvent, the mixing being continuous and with the degree of intensity sufficient to form a homogeneous emulsion.

2. The process of claim 1 wherein aqueous mineral acid that contains phosphorous is a 6 to 10 wt. % aqueous solution of phosphoric acid.

3. The process of claim 1 wherein the mineral acid is present in the organic solvent in an amount of 500 to 2000 ppm.

4. The emulsion prepared by the process of claim 1.

5. In the process of preparing polycarbonate by the interfacial process the improvement comprising mixing with the washed organic polycarbonate solution the emulsion of claim 4, the organic polycarbonate solution having been washed without the use of a phosphorous containing mineral acid.

6. The process of claim 5 wherein the amount of emulsion is that which results in phosphorous content of 0.15 to 2 ppm relative to the weight of the polycarbonate.

7. The polycarbonate prepared by the process of claim 5.

8. A molded article comprising the polycarbonate of claim 7.

9. An extrudate comprising the polycarbonate of claim 7.

10. An optical information storage medium comprising the polycarbonate of claim 7.

* * * * *